UNITED STATES PATENT OFFICE.

ALBERT H. ANDERSON, OF WORCESTER, MASSACHUSETTS, ASSIGNOR TO NORTON COMPANY, OF WORCESTER, MASSACHUSETTS, A CORPORATION OF MASSACHUSETTS.

ABRASIVE AND REFRACTORY ARTICLE AND METHOD OF PRODUCING SAME.

1,364,849. Specification of Letters Patent. Patented Jan. 4, 1921.

No Drawing. Application filed April 17, 1919. Serial No. 290,751.

*To all whom it may concern:*

Be it known that I, ALBERT H. ANDERSON, a citizen of the United States of America, residing at Worcester, in the county of Worcester and State of Massachusetts, have invented certain new and useful Improvements in Abrasive and Refractory Articles and Method of Producing Same, of which the following is a full, clear, and exact specification.

My invention relates to a composition of matter and a method of forming an article therefrom, which may be used for heat refractory, abrasive and other purposes.

It has been customary to make refractory ceramic articles such as rods and cores for electric heating elements or abrasive sharpening stones by forming a plastic mixture of the ingredients and extruding this mass through a die by means of a ram or screw mechanism. These mixtures have heretofore involved such materials as silicon carbid grain mixed with a clay rendered plastic by water. It has been found that, due to the mixture having a low degree of fluidity, it can not be forced through the die except under high pressure, and that it is necessary to lubricate this die to prevent the mass being deformed, broken or otherwise injured in the process. One ordinary type of lubrication has involved a grease cup on the die adapted to force oil or grease between the surface of the material and the die wall. However, the pressure required to be exerted on such clay mixtures as are best adapted for my purposes has been so great and the mechanisms necessary to carry out this method have been so complicated as to make it difficult to lubricate efficiently the entire surface against which the clay material slides.

It has been proposed to mix starch, molasses, glucose, glue, or tar with clay material in order to provide the mixture with carbon for the firing process or to serve as a temporary binder before the clay is burned. These materials, while they serve for the purpose of giving mechanical strength to the unburned shapes, do not have the desired properties required for the extrusion process, the carbohydrates not being lubricants and the glue and tar being viscous, adhesive and of poor lubricating value or drying properties. Tar tends to form a surface skin when exposed to air so that rods cut from the soft plastic mass dry unevenly before they can be fired, whereas the drying operation should be carried on slowly and yet without the development of hard corners or surfaces. It is furthermore found that these materials as previously used tend to disperse and separate the clay particles and keep them from uniting intimately or closely with the abrasive grain.

It is accordingly an object of my invention to overcome such difficulties in the manufacture of ceramic articles by incorporating with the clay material a medium which contains a lubricating agent of low bonding properties adapted to give proper lubrication to the mass, make it workable and permit it to be extruded through a die and properly formed, dried and fired.

It is a further object to provide a composition and a process of manufacture in which the clay material may be developed to its full plasticity in the presence of the lubricating agent, unite satisfactorily with the refractory or abrasive grains and serve as the main bonding agent for the mass during its formation and after the clay has been burned.

With these and other objects in view as will be apparent from the following disclosure, my invention resides in the composition of matter and the steps of a process set forth in the appended claims.

In accordance with my invention I provide a composition of matter for a ceramic article suitable for refractory and abrasive purposes by combining a hard granular refractory material with a clay material and a lubricant, adapted to permit formation of a plastic clay mass in an auger machine or other similar molding or forming apparatus. For the refractory or abrasive material, I may utilize various well known substances, such as silicon carbid or crystalline alumina which may be in the form of corundum, emery or electrically fused alumina.

In order to bond these materials together, I utilize various types of ceramic clay bond, which when mixed with a suitable quantity of water are adapted to develop a large degree of plasticity and hold the grains in a definite form, not only in the burned ceramic ware but also during the period of formation and drying of the articles, and which may be vitrified preferably to a glassy fused condition in a ceramic kiln.

As a specific example of a bond suitable for use with silicon carbid grain, the following ingredients in the proportions listed may be utilized:

Feldspar_ 40% to 80% by weight
Ball clay_ 20% to 60% by weight
Flint ____ 0% to 20% by weight
Slip clay_ 0% to 20% by weight For crystalline alumina, I may utilize the following material:

Feldspar __ 0% to 30% by weight
Ball clay___ 10% to 50% by weight
Fullers' earth 0% to 15% by weight
Slip clay ___ 35% to 70% by weight The bond is mixed with the silicon carbid or alumina grain in amounts varying from 10 to 40% by weight of bond, these proportions depending upon the type and size of the grain used and the refractory or abrasive qualities desired for the article.

In order to lubricate the clay material, I incorporate therewith a lubricating agent which will not dry readily upon exposure to air and which has a sufficiently heavy body to be able to lubricate the extruding mass effectively, is stiff enough to give body to the plastic mass and is able to prevent cracking of the shaped article. A saponified oil mixture known as petroleum grease is such a lubricating agent.

While the amount of grease used may obviously be varied within wide limits, I prefer to employ it in the proportion of about 4% by weight to 96% of the crystalline grain and clay material, as this gives sufficient lubrication without seriously impairing the bonding qualities of the clay during formation of the article. I may of course utilize the adhesive qualities of the grease to help bond the unburned mixture and suitably change the proportions to produce this result.

The following procedure may be adopted for mixing the materials and forming the shaped article, although it is clear that the same may be varied within the scope of the appended claims. The grain, which may be crystalline alumina, is intimately mixed with the clay material and wetted with a sufficient amount of water to develop the full or desired plasticity of the mass, thereby forming an intimate mixture of these two bodies. I then add the minimum amount of grease needed to give sufficient lubrication to make it possible to force the mass easily through a die. After the article has been formed in the desired shape as by means of a press or other molding apparatus, it may be laid upon a plaster batt and permitted to dry for a given period of time, depending upon the atmospheric and other surrounding conditions, until the rod is in proper condition for firing. The mass is then placed in a suitable ceramic kiln and burned at a vitrifying or fusing temperature which may be around 1200 centigrade or 1300° centigrade. This operation may be carried on for a suitable length of time of course depending upon the nature of the article being burned and the degree of vitrification desired, as well as upon the amount of heat applied to the mass.

In accordance with this invention, I have provided a simple, expeditious and economical method of producing refractory or abrasive articles in large quantities and of insuring that these products come through the process uniform in size and in appearance and without surface cracks or other undesirable deformations which usually arise in shaping the article from a plastic mass.

I claim:—

1. A composition of matter for forming ceramic articles comprising refractory or abrasive crystalline grains, a plastic clay, water and an oily lubricating agent.

2. A composition of matter for forming a ceramic article comprising refractory or abrasive crystalline grains, a plastic clay material, water and a grease.

3. A composition of matter for forming ceramic articles comprising refractory or abrasive grains, a plastic clay material and water intimately mixed together as a plastic mass, and an oily lubricating medium surrounding masses of the mixed clay material and grain.

4. A composition of matter for forming ceramic articles comprising refractory or abrasive crystalline material, a plastic clay material and water intimately mixed together as plastic masses separated by a magma of petroleum grease lubricant.

5. The process of making a ceramic article comprising mixing grease with a granular abrasive or refractory material, a clay material and water as a plastic mass, and then forming the mixture into a shaped article.

6. The process of forming a ceramic article comprising the steps of mixing refractory or abrasive crystalline grains with plastic clay water and grease extruding the mass through a die and forming a shaped article and thereafter vitrifying the clay bond.

7. The process of forming a ceramic article comprising mixing refractory or abrasive crystalline grains with a plastic clay material and water until the plasticity of the clay has been developed, mixing a lubricating petroleum grease therewith to form grease coated mixture of grains and clay material, shaping an article by extruding the mass through a die and thereafter firing the same to vitrify the clay material and bond the grains together.

Signed at Worcester, Massachusetts, this 16th day of April, 1919.

ALBERT H. ANDERSON.